United States Patent

Hsiao et al.

[15] 3,656,107

[45] Apr. 11, 1972

[54] AUTOMATIC DOUBLE ERROR DETECTION AND CORRECTION APPARATUS

[72] Inventors: Mu-Yue Hsiao; Wadie F. Mikhail, both of Poughkeepsie, N.Y.

[73] Assignee: International Business Machines Corporation, Armonk, N.Y.

[22] Filed: Oct. 23, 1970

[21] Appl. No.: 83,334

[52] U.S. Cl. ....................340/146.1

[51] Int. Cl. ....................G08c 25/00

[58] Field of Search ....................340/146.1, 174.1 B; 235/153

[56] References Cited

UNITED STATES PATENTS 3,328,759 6/1967 Blaauw et al. ....................340/146.1

3,449,718 6/1969 Woo ....................340/146.1

3,562,709 2/1971 Srinivasan ....................340/146.1

*Primary Examiner*—Charles E. Atkinson

*Attorney*—Ralph L. Thomas and Thomas & Thomas

[57] ABSTRACT

A method and apparatus are provided for detecting and correcting double errors automatically by generating syndrome S bits from a binary word having check bits and data bits. The syndrome S bits themselves are decoded to locate and correct single errors. Wen double errors occur in the binary word, the syndrome S bits automatically operate a switching device which changes the bits of the binary word one at a time to correct one of the double errors. If one of the double errors is not corrected when a given bit is changed, this is indicated by the syndrome S bits, and the bit under test is restored as the next bit of the binary word is changed or complemented. Whenever one of the double errors is corrected by the switching device, the syndrome bits then indicate the location of the remaining single error, and the syndrome S bits are decoded to correct the second one of the double errors.

10 Claims, 5 Drawing Figures

INVENTORS
MU-YUE HSIAO
WADIE F. MIKHAIL

BY Thomas & Thomas
ATTORNEYS

AUTOMATIC DOUBLE ERROR DETECTION AND CORRECTION APPARATUS

CROSS-REFERENCE TO RELATED APPLICATIONS

Application Ser. No. 887,858 for Optimum Apparatus And Method For Checking Bit Generation And Error Detection, Location and Correction by M. Y. Hsiao et al. filed Dec. 24, 1969.

Application Ser. No. 79,553 For Automatic Double Error Detection and Correction Device by M. Y. Hsiao et al. filed Oct. 9, 1970.

BACKGROUND OF THE INVENTION

1. This invention related to error detection and correction devices and more particularly to such devices for detecting and correcting single and double errors in binary words.

2. If accuracy must be assured in data processing equipment, it is customary to provide single error detection and correction equipment even though the added cost may be relatively high. When one of the many earlier types of error checking devices is added to detect and correct double errors, the cost becomes exceedingly high because of the large quantity of equipment involved, especially as the word length increases because the added redundancy expands at a rapid rate. Therefore, the need exists for error detection and correction equipment which detects and corrects double errors in a binary word having many bits and which does so with only a moderate increase in cost. It is to this problem that the present invention is directed.

SUMMARY OF THE INVENTION

It is a feature of this invention to provide a novel error detection and correction device which can detect and correct single and double errors and detect triple errors in a binary word.

It is a feature of this invention to provide an improved error detection and correction device at a moderate cost which can detect and correct single and double errors in a binary word which has many binary bits.

It is a feature of this invention to provide a novel method for detecting and correcting single and double errors and detecting triple errors in a binary word which has many bits.

In one arrangement according to this invention a register stores a binary word having a plurality of bits including check bits and data bits, and a checking device responds to the check bits and the data bits to generate a plurality of syndrome S bits. The syndrome S bits are supplied to a decoder which responds to a valid combination of syndrome S bits to correct a single error in the register. If the binary word in the register is error free, each of the syndrome S bits holds a binary zero, and the checking operation terminates. If there is a single error in the binary word in the register, the syndrome S bits hold a valid combination of code bits which can be decoded to locate and correct the single error. If the binary word in the register has two or more errors, the syndrome S bits do not hold a valid combination which can be decoded. In this event multiple errors are assumed. If even multiple errors are detected, then double errors are assumed. The bits of the binary word are reversed one at a time by a switching device, and new syndrome S bits are generated to see if one of the double errors is corrected. If not, then the bit under test is restored to its original binary state, and the switching device is operated to test another bit. The test operations continue automatically until one of the double errors is corrected by the switching device after which the new syndrome S bits, specifying the location of the remaining single error, are decoded to correct the second error.

A novel method if provided according to this invention for detecting and correcting single and double errors in a binary word having check bits and data bits, and the method comprises the steps of:

1. storing the binary word,
2. generating syndrome S bits from the check bit and the data bits of the binary word, 3. correcting single errors directly by decoding the syndrome S bits and
4. correcting double errors by reversing the binary state, and then restoring the original binary state if an error is not corrected, to the bits of the binary word one at a time until one of the double errors is corrected, and
5. then correcting the remaining single error by decoding the new syndrome S bits.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
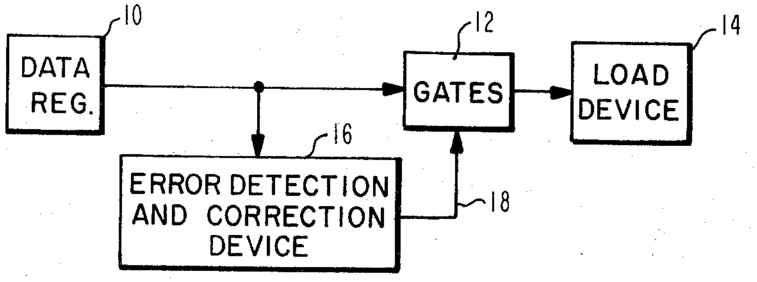
FIG. 1 illustrates a system which utilizes an error detection and correction device.

Reference is made to FIG. 1 for a system which incorporates an error detection and correction device according to this invention. Positive logic arbitrarily is assumed in the circuits employed unless indicated otherwise, e.g., positive input signals to an AND circuit provide a positive output signal. Binary 1 is represented by a positive signal, and binary 0 is represented by a negative signal unless otherwise indicated. Information stored in a data register 10 is checked before it is forwarded through a set of gates 12 to a load device 14. The information in the data register 10 is supplied to an error detection and correction device 16 which checks for errors. If the information in the data register 10 is error free, the error detection and correction device 16 provides a positive signal on the line 18 which operates the set of gates 18 to transfer the information in the data register 10 to the load device 14. If a single error or double errors are found, they are corrected and then the error detection and correction device 16 supplies a positive signal on the line 18 which operates the set of gates 12 to transfer the information from the data register 10 to the load device 14. If there are more than two errors, they cannot be corrected, and a positive signal is not supplied on the line 18 to the set of gates 12. Thus information is supplied to the load device 14 if, and only if, it is error free. The error detection and correction device 16 in FIG. 1 is illustrated in greater detail in block form in FIG. 2.

Figure 2:
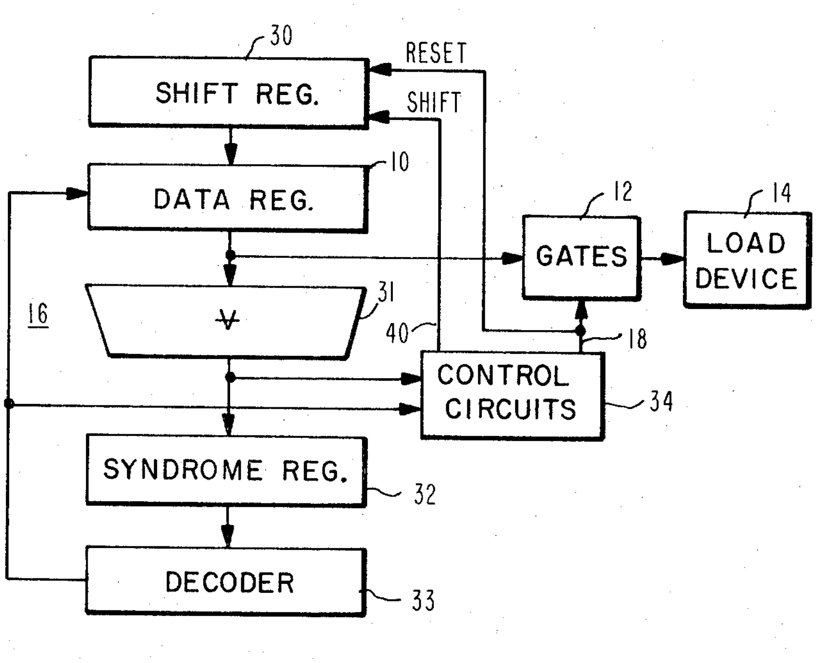
FIG. 2 illustrates in block form an error detection and correction system according to this invention.

Referring next to FIG. 2, a shift register 30 is connected to the data register 10, and the shift register is employed as an automatic switching device to complement in succession the bits of the data register 10 for checking purposes described more fully hereinafter. The data register 10 is connected to an exclusive OR-tree 31 which generates syndrome S bits $s_1, s_2, \ldots s_n$. The syndrome S bits are stored in a syndrome register 32, and the syndrome register 32 supplies the syndrome S bits to a decoder 33. The decoder 33 is connected to the data register 10. For the single error case, the syndrome S bits from the syndrome register 32 operate the decoder 33 to select one of a plurality of output lines, and the selected output line is energized with a positive signal to correct the associated word bit in the data register 10. The decoder 33 and the exclusive OR-tree 31 are connected to a control circuit 34. When the exclusive OR-tree 31 generates syndrome S bits which are all equal to zero, this indicates that the information in the data register 10 is error free, and the control circuit 34 supplies a positive signal on the line 18 to operate the set of gates 12 thereby to transfer the content of the data register 10 to the load device 14. If there is a single error in the content of the data register 10, the syndrome S bits from the exclusive OR-tree 31 represent a valid combination of codes bits, and they pass through the syndrome register 32 to operate the decoder 33 which in turn corrects the single error. If the content of the data register 10 has an even number of errors, the syndrome S bits from the exclusive OR-tree 31 represent an invalid combination of code bits which can not be decoded by the decoder 33, and the control circuit 34 then supplies a positive pulse on a line 40 which shifts the shift register 30 to complement the first bit of the data register 10. Double errors are assumed, and the correction process proceeds on this assumption. If the first bit is corrected by the complementing operation, the content of the data register 10 then holds a single error, and a new set of syndrome S bits are generated by the exclusive OR-tree 31. These syndrome S bits are used by the decoder 33 to correct the single error. If, however, the first bit of the data register 10 is changed from a correct bit to an error bit by the complementing operation of the shift register 30, then the content of the data register 10 holds three errors instead of the former two errors. In this event the syndrome S bits generated by the exclusive OR-tree 31 have an odd number of binary ones, and this provides an odd parity. The odd parity of the syndrome S bits is detected by the control circuit 34. The syndrome S bits for the triple error case represent an invalid combination of code bits, and the decoder 33 does not operate. The decoder 33 operates if, and only if, the syndrome S bits represent a valid combination of code bits signifying a single error. The control circuit 34 detects the failure of the decoder 33 to operate. The control circuit 34, therefore, responds to the odd parity of the syndrome S bits and the failure of the decoder 33 to operate, and this indicates that the content of the data register 10 holds triple errors. The control circuit 34 then supplies another positive pulse on the line 40 to shift the shift register 30 again. This shift operation by the shift register complements the first and second bits of the data register 10. The first bit is complemented to restore it to its original state, and the second bit is complemented as part of the search to find and correct one of the double errors in an effort to reduce the double error case to a single error case. If, however, the control circuit 34 determines again that there are triple errors, this indicates that the second bit of the data register 10 is good, and the shift register 30 is shifted once again to complement the second and third bits of the data register 10. The third bit is complemented for test purposes, and the second bit is complemented to restore its initial correct status. The checking process continues in this fashion until one of the double errors in the data register 10 is corrected by the complementing operation of the shift register 30. When this occurs, the remaining single error is indicated by a valid combination of the syndrome S bits from the exclusive OR-tree 31, and they are decoded by the decoder 33 to correct the remaining single error. The content of the data register 10 is then error free, and this is signified by the presence of all zeros in the syndrome S bits supplied to the control circuit 34. The control circuit 34 then provides a positive output signal on the line 18 which resets the shift register 30 and operates the gates 12 to transfer the content of the data register 10 to the load device 14.

The apparatus according to this invention detects and corrects single errors, and it detects and corrects double errors and detects all triple errors. The single error case is treated separately from the double error case. Various error detection and correction codes may be effectively employed. The Bose-Chaudhuri class of error detection and correction codes are suitable, and they are preferred. The particular code employed from this class of codes depends upon the length of the binary word used. It is assumed for purposes of illustration herein that a binary word of 45 bits is used. The first 13 bits are check bits, and the remaining 32 bits are data bits. The word format is as follows:

| | |
|---|---|
| Work Bits | 45, — 15, 14, 13, — 2, 1 |
| | D B D |
| Function | B — B B C13 — C2 C1 |
| | 32 2 1 (1) |

The 45 bits of the word can be supplied to an exclusive OR tree to yield 13 syndrome S bits $s_{13}, s_{12}, \ldots s_1$.

A suitable one of the Bose-Chaudhuri codes which may be employed in this invention is given below in Table 1.

TABLE 1

| | C13 | C12 | C11 | C10 | C9 | C8 | C7 | C6 | C5 | C4 | C3 | C2 | C1 |
|---|---|---|---|---|---|---|---|---|---|---|---|---|---|
| 1 | 0 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 0 | 1 | 0 |
| 3 | 0 | 0 | 0 | 0 | 0 | 0 | 0 | 0 | 0 | 0 | 1 | 0 | 0 |
| 4 | 0 | 0 | 0 | 0 | 0 | 0 | 0 | 0 | 0 | 1 | 0 | 0 | 0 |
| 5 | 0 | 0 | 0 | 0 | 0 | 0 | 0 | 0 | 1 | 0 | 0 | 0 | 0 |
| 6 | 0 | 0 | 0 | 0 | 0 | 0 | 0 | 1 | 0 | 0 | 0 | 0 | 0 |
| 7 | 0 | 0 | 0 | 0 | 0 | 0 | 1 | 0 | 0 | 0 | 0 | 0 | 0 |
| 8 | 0 | 0 | 0 | 0 | 0 | 1 | 0 | 0 | 0 | 0 | 0 | 0 | 0 |
| 9 | 0 | 0 | 0 | 0 | 1 | 0 | 0 | 0 | 0 | 0 | 0 | 0 | 0 |
| 10 | 0 | 0 | 0 | 1 | 0 | 0 | 0 | 0 | 0 | 0 | 0 | 0 | 0 |
| 11 | 0 | 0 | 1 | 0 | 0 | 0 | 0 | 0 | 0 | 0 | 0 | 0 | 0 |
| 12 | 0 | 1 | 0 | 0 | 0 | 0 | 0 | 0 | 0 | 0 | 0 | 0 | 0 |
| 13 | 1 | 0 | 0 | 0 | 0 | 0 | 0 | 0 | 0 | 0 | 0 | 0 | 0 |
| 14 | 0 | 0 | 1 | 0 | 0 | 1 | 0 | 0 | 1 | 1 | 1 | 1 | 1 |
| 15 | 0 | 0 | 1 | 0 | 1 | 0 | 1 | 1 | 0 | 0 | 1 | 0 | 0 |
| 16 | 0 | 0 | 1 | 0 | 1 | 1 | 0 | 0 | 1 | 0 | 0 | 0 | 1 |
| 17 | 0 | 0 | 1 | 1 | 0 | 0 | 1 | 1 | 0 | 0 | 1 | 1 | 1 |
| 18 | 0 | 0 | 1 | 1 | 0 | 1 | 1 | 1 | 1 | 0 | 0 | 1 | 0 |
| 19 | 0 | 0 | 1 | 1 | 1 | 0 | 1 | 0 | 0 | 1 | 0 | 1 | 1 |
| 20 | 0 | 0 | 1 | 1 | 1 | 1 | 0 | 0 | 0 | 0 | 0 | 1 | 0 |
| 21 | 0 | 1 | 0 | 0 | 0 | 1 | 1 | 1 | 1 | 1 | 1 | 0 | 0 |
| 22 | 0 | 1 | 0 | 0 | 1 | 0 | 0 | 1 | 0 | 1 | 0 | 0 | 1 |
| 23 | 0 | 1 | 0 | 0 | 1 | 1 | 1 | 0 | 0 | 1 | 0 | 0 | 0 |
| 24 | 0 | 1 | 0 | 1 | 0 | 0 | 0 | 1 | 1 | 0 | 0 | 0 | 1 |
| 25 | 0 | 1 | 0 | 1 | 0 | 1 | 1 | 1 | 0 | 0 | 0 | 1 | 1 |
| 26 | 0 | 1 | 0 | 1 | 1 | 0 | 1 | 0 | 1 | 0 | 0 | 1 | 1 |
| 27 | 0 | 1 | 0 | 1 | 1 | 1 | 0 | 0 | 1 | 0 | 1 | 0 | 1 |
| 28 | 0 | 1 | 1 | 0 | 0 | 0 | 0 | 1 | 1 | 1 | 1 | 1 | 0 |
| 29 | 0 | 1 | 1 | 0 | 0 | 1 | 0 | 0 | 0 | 1 | 0 | 0 | 1 |
| 30 | 0 | 1 | 1 | 0 | 1 | 0 | 1 | 0 | 1 | 0 | 0 | 0 | 0 |
| 31 | 0 | 1 | 1 | 0 | 1 | 1 | 1 | 1 | 1 | 0 | 1 | 0 | 1 |
| 32 | 0 | 1 | 1 | 1 | 0 | 0 | 1 | 1 | 0 | 1 | 0 | 0 | 1 |
| 33 | 0 | 1 | 1 | 1 | 0 | 1 | 0 | 0 | 1 | 0 | 0 | 0 | 0 |
| 34 | 0 | 1 | 1 | 1 | 1 | 0 | 0 | 1 | 0 | 1 | 1 | 0 | 0 |
| 35 | 0 | 1 | 1 | 1 | 1 | 1 | 1 | 0 | 0 | 0 | 0 | 0 | 1 |
| 36 | 1 | 0 | 0 | 0 | 0 | 1 | 0 | 0 | 1 | 1 | 0 | 0 | 1 |
| 37 | 1 | 0 | 0 | 0 | 1 | 0 | 0 | 0 | 1 | 0 | 0 | 1 | 1 |
| 38 | 1 | 0 | 0 | 0 | 1 | 1 | 0 | 0 | 0 | 0 | 1 | 0 | 1 |
| 39 | 1 | 0 | 0 | 1 | 0 | 0 | 1 | 0 | 0 | 1 | 0 | 0 | 1 |
| 40 | 1 | 0 | 0 | 1 | 0 | 1 | 0 | 0 | 0 | 0 | 0 | 1 | 1 |
| 41 | 1 | 0 | 0 | 1 | 1 | 0 | 0 | 1 | 0 | 0 | 0 | 0 | 1 |
| 42 | 1 | 0 | 1 | 1 | 1 | 1 | 0 | 0 | 0 | 1 | 0 | 0 | 1 |
| 43 | 1 | 1 | 1 | 0 | 1 | 1 | 0 | 1 | 0 | 0 | 1 | 0 | 0 |
| 44 | 1 | 1 | 1 | 1 | 0 | 1 | 0 | 0 | 0 | 1 | 1 | 0 | 0 |
| 45 | 1 | 1 | 1 | 1 | 1 | 0 | 1 | 1 | 0 | 0 | 0 | 1 | 1 |

Table 1 illustrates an error detection and correction code in the form of a matrix which has 45 rows and 13 columns. The rows are numbered 1 through 45, and each row has 13 bits. The 13 columns each have 45 bits. Each of the columns in Table 1 are related to check bits C1 through C13. The binary ones in the column on the right indicate which word bits the check bit C1 checks in a 45-bit word. For example, check bit C1 in an error free word has a parity which is related to the parity of word bits 1, 14, 16, 17, 19, 22, 24, 25, 26, 27, 29, 31, 32, 35, 36, 37, 38, 39, 40, 41, 42, and 45. The check bit C2 checks the word bits indicated by the binary ones located in the second column from the right from Table 1. In like manner it can be determined which word bits are checked by the check bits C3 through C13 merely by observing the location of binary ones throughout the various associated columns in Table 1.

When the 45 bits of a binary word are supplied to the exclusive OR-tree 31 in FIG. 2, a network of individual exclusive OR circuits within the tree provide an output of 13 syndrome S bits. An explanation is given next as to the logical manner in which the 13 syndrome S bits are determined. The check bits C1 checks the word bits pointed out above, and the logical function of exclusive ORing these various word bits by their bit number in the exclusive OR tree is expressed as follows:

$$C1 = [14 \veebar 16 \veebar 17 \veebar 19 \veebar 22 \veebar 24 \veebar 25 \veebar 26 \veebar 27 \veebar 29 \veebar 31 \veebar 32 \veebar 35 \veebar 36 \veebar 37 \veebar 38 \veebar 39 \veebar 40 \veebar 41 \veebar 42 \veebar 45] = \Sigma_1 \qquad (2)$$

The result of this checking operation is $\Sigma_1$ which is a binary zero or a binary one, and it is compared with the check bit $C1$ to determine $s_1$. Thus $s_1$ is expressed as follows:

$$s_1 = C1 \veebar \Sigma_1$$

The check bit $C2$ checks the corresponding word bits indicated by the binary ones in the second column from the right in Table 1. The check bit $C2$ may be expressed as follows:

$$C2=[14 \forall 17 \forall 18 \ldots \forall 45]=\Sigma_2 \quad (4)$$

The result of this checking operation is $\Sigma_2$ which is a binary zero or a binary one, and it is compared with the check bit $C2$ to determine syndrome bit $s_2$. Thus, $s_2$ may be expressed as follows:

$$s_2 = C2 \forall \Sigma_2 \quad (5)$$

It is easily seen, if this process is continued, how the syndrome bits $$s_3 = C_3 \forall \Sigma_3,\ s_4 = C_4 \forall \Sigma_4 \ldots \quad (6)$$

and $s_{13} = C_{13} \forall \Sigma_{13}$ are determined

It is pointed out that the data bits DB1 through DB32 are checked and the appropriate values of the check bits C1 through C13, as determined above, are assigned before a word is transferred to the data register 10 in FIG. 2. When the binary word with check bits and data bits is supplied to the data register 10 in FIG. 2 the check bits as well as the data bits must be checked and this is done by the exclusive OR-tree 31 which computes the syndrome S bits $s_1$, through $s_{13}$ in the manner explained above.

Single errors are detected and corrected wherever they occur. A single error may occur in the check bits or the data bits. Double errors are detected and corrected, and such errors may occur in the data bits only, in the check bits only, or in the check bits and the data bits.

If the word syndrome S bits from the exclusive OR-tree 31 in FIG. 2 have an odd value of 1's, then there are an odd number of errors, and the number of errors may be 1, 3, 5, 7, etc. If the word syndrome S bits have an even value of 1's, then there are an even number of errors, and the even number of mistakes may be 2,4,6,8, etc. If the word syndrome S bits have an odd value of 1's, then there are odd number of errors. The case for a single error has a much greater probability of occurring than the case of a triple error. The case for triple errors, has a greater probability than the case for quintuple errors, and the case for septuple errors has a much less probability than the case for quintuple errors. For an even parity of the word syndrome S bits the case for double errors has a greater probability of occurring than the case for quadruple errors. The case for sextuple errors has a much less probability than the case for quadruple errors, and the case for sextuple errors occurring is much greater than the case for octuple errors. The case for a single error has a much greater probability of occurring than the case for double errors. It is seen, therefore, that the case for a single error and the case for double error have a much greater probability of occurring than the case for any other higher number of errors. If an error detection and correction device can correct for the cases of single and double errors, it is effective to correct almost all cases for errors in a binary word. It is this high probability that is covered by the error detection and correction device of this invention.

The control circuit 34 in FIG. 2 can determine if there are (1) no errors, (2) single errors, (3) double errors or a higher number of even errors, and (4) triple errors or a higher number of odd errors. If there are no errors in a binary word, the syndrome S bits have all zeros, and the binary word is transferred to the load device 14. If a single error occurs in a binary word, the syndrome S bits generate a valid combination of code bits which are identical to one of the combinations of bits in rows 1 through 45 in Table 1, and the decoder 33 responds to the valid combination of code bits to correct the specified binary word bit. If two or more errors occur, double errors are assumed, and the control circuit 34 operates the shift register 30 successively to complement each bit in turn of the data register 10 in an effort to locate one of the double errors. As soon as one of the double errors is located by this successive complementing process, the remaining single error is detected and corrected by the syndrome S bits as pointed out above for the single error case. If triple errors occur during the successive complementing operations for the double error case, the control circuit 34 determines that the word bit under test previously was correct, and the control circuit 34 operates the shift register 30 to complement the bit being tested, thereby to restore it to the correct state, as the next word bit is complemented for test purposes.

If the word bit arrangement shown in equation (1) is used and a pair of errors occur, the two errors may be disposed in any one of many pair locations in the word bits 1 through 45. There are many combinations of pair locations in the 45 bits of the binary word, and each bit of the word must be checked for an error until one of the double errors is found. The speed at which one of a pair of errors is corrected varies with the distribution of the double errors in the word. If one of a pair of errors lies in a low order word bit, then the speed at which both errors are corrected is much greater than the case where both errors lie in high order word bits. For example, if one error of a pair of errors is disposed in bit 1 of a word, then one of the errors is detected and corrected by the first test operation in the double error case. The second error then is readily detected and corrected by the syndrome S bits. It is seen that the correction process is rapid for this case. If, however, a pair of double errors are disposed in the high order word bits, then many test operations must take place before one of the double errors is found. The worst case for speed of error correction in the double error case occurs when word bits 44 and 45 are in error. In this event 44 test operations must take place before the first one of the double errors is found. Thus it is seen that the speed of operation for the double error case depends on the distribution of double errors throughout the bits of the binary word in the data register 10.

Figure 3:
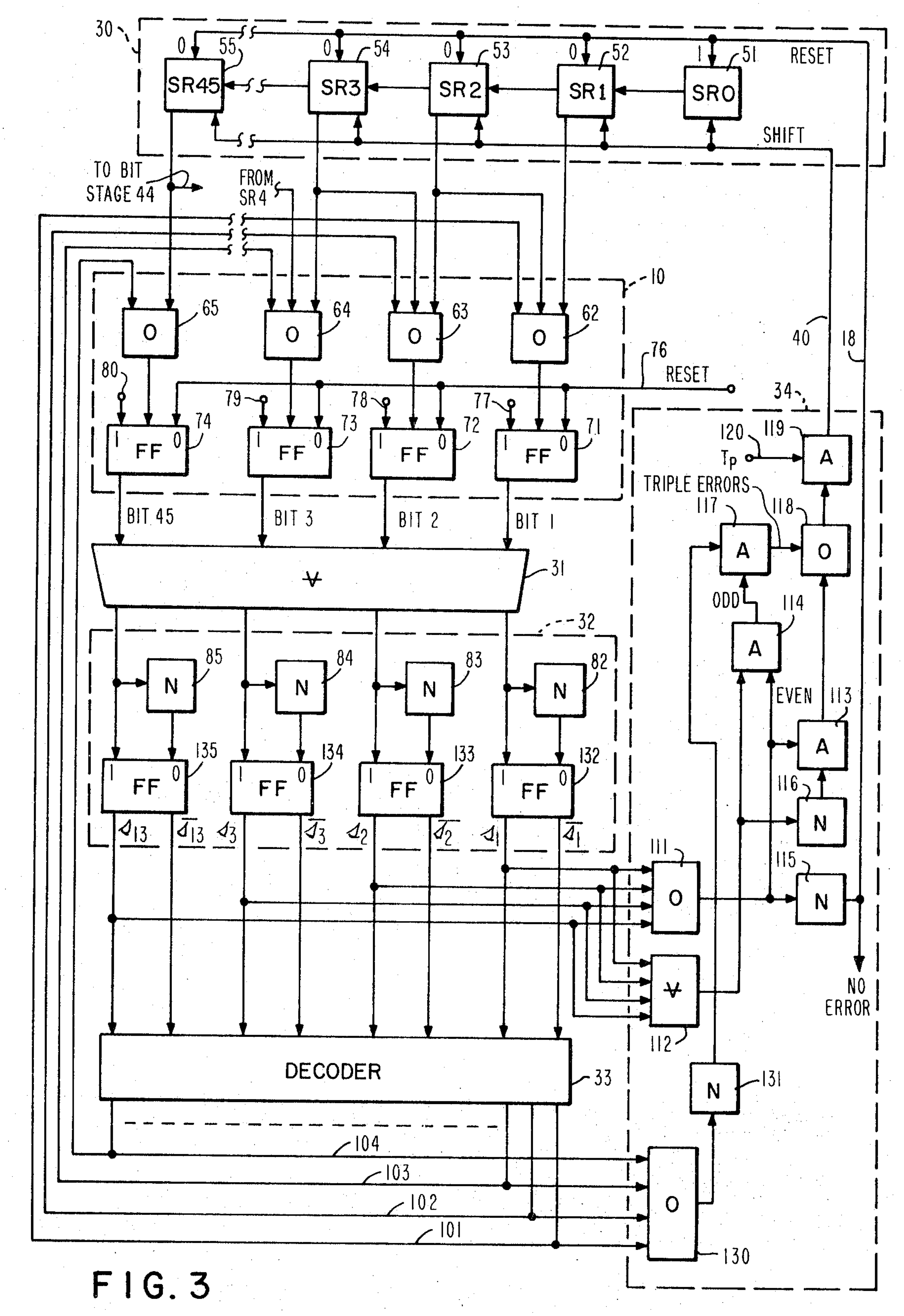
FIG. 3 illustrates in detail the error detection and correction arrangement shown in block form in FIG. 2.

Reference is made next to FIG. 3 which illustrates in greater detail the error detection and correction arrangement illustrated in FIG. 2. The shift register 30 includes 46 shift register stages SR0 through SR 45. Only five stages labelled 51 through 55 are shown. Positive signals from the shift register stages labelled 52 through 55 are supplied through associated OR circuits 62 through 65 to the complement input of respective stages 71 through 74 thereby to complement or reverse the state of these flip-flops in the data register 10. The data register 10 includes 45 stages of which only four stages are shown. Positive signals from shift register stages 53 and 54 are supplied also through respective OR-circuits 62 and 63 to the complement input of the corresponding stages 71 and 72 thereby to complement or reverse the state of these flip-flops in the data register 10. The OR-circuit 64 receives an output signal from a shift register stage from SR 4, not shown. The shift register stage 55 supplies a signal to the input of the stage for binary word bit 44, also not shown. It is seen, therefore, that each of the shift register stages SR 1 through SR 45 supplies a positive output signal which complements the corresponding stage of the data register 10 for test purposes and complements the preceding stage of the data register to restore the status it held prior to the preceding test. It is noted in this connection that the OR-circuits 62 through 65 are connected to the complement input of the flip-flops 71 through 74. Each time a positive signal is supplied on the complement input to these flip-flops, they reverse their binary state.

Information is supplied to the data register 10 from the A source not shown. The data register 10 is first reset by a positive signal applied on a reset line 76. Then positive signals representing binary ones are supplied to the one inputs lines 77 through 80 to set the associated flip-flops 71 through 74 to one state.

Output signals from the flip-flops 71 through 74 are supplied to the exclusive OR-tree 31 which generates the syndrome S bits as previously explained. The exclusive OR-tree 31 is not treated in detail herein since its tree arrangement of exclusive OR circuits readily can be determined from the logic expressed in equations (3), (5), and (6). Reference is made, however, to co-pending application Ser. No. 887,858 for Optimum Apparatus and Method For Checking Bit Generation and Error Detection, Location and Correction filed on Dec. 24, 1969 by M. Y. Hsaio, et al. which illustrates in detail how such an exclusive OR tree is constructed for checking purposes.

The syndrome register 32 in FIG. 3 has 13 stages for the bits $s_1$ through $s_{13}$. Only stages 132 through 135 for respective syndrome S bits $s_1$, $s_2$, $s_3$, and $s_{13}$ are shown. Inverter circuits 82 through 85 receive output signals from the exclusive OR-tree 31 and supply them to the zero input side of respective flip-flops 132 through 135. If an output signal from the exclusive OR-tree 31 is a positive signal, it sets the associated flip-flop to the binary one state. If an output signal from the exclusive OR-tree 31 is a negative signal, it is changed to a positive signal by the associated inverter circuit, and the positive signals from the inverter circuit resets the associated flip-flop to the zero state. One and zero output signals from the flip-flops 132 through 135 are supplied to the decoder 33. The decoder 33 shown in block form in FIG. 3 is illustrated in greater detail in FIG. 4.

Figure 4:
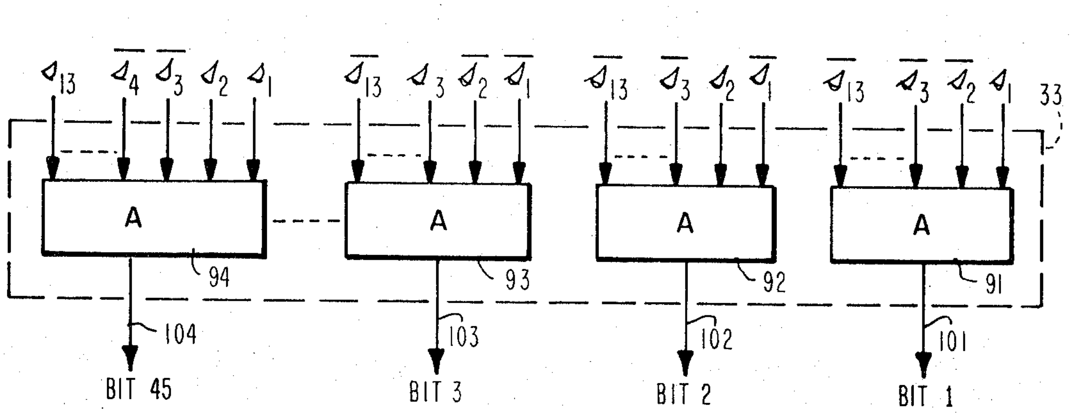
FIG. 4 illustrates in detail the decoder shown in block form in FIG. 3.

Referring next to FIG. 4, the decoder 33 includes 45 AND circuits, one for each word bit of the data register 10. Only four AND-circuits 91 through 94 are shown. When operated, the AND- circuits 91 through 94 supply positive output signals on respective lines 101 through 104, and these positive signals are supplied through respective OR-circuits 62 through 65 to the complement input of corresponding flip-flops 71 through 74 of the data register 10. A positive signal on any one of the lines 101 through 104 complements the associated one of the flip-flops 71 through 74. The AND-circuits 91 through 93 respond to positive signals representing the valid code combinations in respective rows 1 through 3 of Table 1 to provide a positive output signal on the associated lines 101 through 103. The AND-circuit 94 responds to the valid combination of code signals shown in row 45 of Table 1 to provide a positive output signal on the line 104. AND circuits, now shown in FIG. 4, respond to the valid code combinations of corresponding rows 4 through 44 in Table 1 to provide positive output signals on lines not shown for the purpose of correcting or complementing the flip-flops for word bits 4 through 44, also not shown. For the purpose of illustrating how the AND circuit of the decoder 33 operates, let it be assumed, that a binary word in the data register 10 has a single mistake in word bit 1. The syndrome S bits generated by the exclusive OR-tree 31 in FIG. 3 are supplied through the syndrome register 32 to the decoder 33, and they have the valid code combination of signals shown in row 1 of Table 1. The AND-circuit 91 in FIG. 4 receives a positive signal on the line labelled $s_1$ representing a binary one. The lines labelled $\bar{s}_2$ through $\bar{s}_{13}$ each have positive signals representing binary zeros. All of the input lines to the AND-circuit 91 have positive signals, and the AND-circuit 91 provides a positive signal on the output line 101, and this OR-circuit 111 determines whether or not there are errors, and the exclusive OR-circuit 111 determines whether there are an even number of errors or an odd number of errors. The exclusive OR-circuit 112 includes a plurality of individual exclusive OR circuits which are interconnected to determine the parity of the syndrome S bits. When the exclusive OR-circuit 112 provides a positive output signal representing a binary one, this indicates an odd parity. When the exclusive OR-circuit 112 provides a negative output signal representing a binary zero, it indicates an even parity. When the output of the OR-circuit 111 is a positive signal, it indicates the presence of one or more errors. When the output of the OR-circuit 111 is a negative signal, it indicates the absence of any error. The output of the OR-circuit 111 is supplied to AND-circuits 113 and 114. The output of the OR-circuit 111 is supplied also through an inverter 115 to the line 18. The output of the exclusive OR-circuit 112 is supplied to the AND-circuit 114, and it is supplied through an inverter 116 to the AND-circuit 113. The output of the AND-circuit 114 is supplied to an AND-circuit 117, and the output of the AND-circuit 117 is supplied through an OR-circuit 118 to an AND-circuit 119. The output of the AND-circuit 113 also is supplied through the OR-circuit 118 to the AND-circuit 119. The AND-circuit 119 receives positive timing pulses $T_p$ on a line 120. Signals from the decoder 33 on the lines 101 through 104 are supplied through an OR-circuit 130 and an inverter 131 to the AND-circuit 117.

The operation of the error detection and correction device according to this invention is illustrated next with reference to FIG. 3, and for this purpose let it be assumed that the data register 10 holds a binary word which equals the decimal value of three. In this case the data bit DB1 (Word bit 14)and the data bit DB2 (word bit 15) are binary ones, and the data bits DB3 (word bit 16) through DB32 (word bit 45) are binary zeros. The check bits C1 through C13 (word bits 1 through 13) are determined according to equations (2) through (6). Table 2 below is employed as a convenience to represent the various quantities discussed. Word bits of the binary word in the data register 10 are shown in row 1 of Table 2, and the function of each bit is illustrated in row 2 of Table 2. Data bit DB1 is the lowest order data bit, and data bit DB32 is the highest order data bit. The check bits and the data bits in binary form for the number three held in the data register 10 are illustrated in row 3 of Table 2.

TABLE 2

| | | | | | | | | | | | | | | | | | | | | | | Rows |
|---|---|---|---|---|---|---|---|---|---|---|---|---|---|---|---|---|---|---|---|---|---|---|
| Word Bits | 45 | ... | 19 | 18 | 17 | 16 | 15 | 14 | 13 | 12 | 11 | 10 | 9 | 8 | 7 | 6 | 5 | 4 | 3 | 2 | 1 | 1 |
| Function | D B 32 | ... | D B 6 | D 3 5 | D B 4 | D B 3 | D B 2 | D B 1 | C 13 | C 12 | C 11 | C 10 | C 9 | C 8 | C 7 | C 6 | C 5 | C 4 | C 3 | C 2 | C 1 | 2 |
| N=3 | 0 | ... | 0 | 0 | 0 | 0 | 1 | 1 | 0 | 0 | 0 | 0 | 1 | 1 | 1 | 1 | 1 | 1 | 0 | 1 | 1 | 3 |
| Error | | | | | | | | | | | | | | | | | | | | X | | 4 |
| Single Error Word | 0 | ... | 0 | 0 | 0 | 0 | 1 | 1 | 0 | 0 | 0 | 0 | 1 | 1 | 1 | 1 | 1 | 1 | 0 | 0 | 1 | 5 |
| S=Word Bit 2 | | | | | | | | | 0 | 0 | 0 | 0 | 0 | 0 | 0 | 0 | 0 | 0 | 0 | 1 | 0 | 6 |
| Double Errors | | | | | | | | | | | | | | | | | | | X | X | | 7 |
| Double Error Word | 0 | ... | 0 | 0 | 0 | 0 | 1 | 1 | 0 | 0 | 0 | 0 | 1 | 1 | 1 | 1 | 1 | 1 | 1 | 0 | 1 | 8 |
| $S_0$=Double Error | | | | | | | | | 0 | 0 | 0 | 0 | 0 | 0 | 0 | 0 | 0 | 0 | 1 | 1 | 0 | 9 |
| Triple Error Word | 0 | ... | 0 | 0 | 0 | 0 | 1 | 1 | 0 | 0 | 0 | 0 | 1 | 1 | 1 | 1 | 1 | 1 | 1 | 0 | 0 | 10 |
| $S_1$=Triple Error | | | | | | | | | 0 | 0 | 0 | 0 | 0 | 0 | 0 | 0 | 0 | 0 | 1 | 1 | 1 | 11 |
| Single Error Word | 0 | ... | 0 | 0 | 0 | 0 | 1 | 1 | 0 | 0 | 0 | 0 | 1 | 1 | 1 | 1 | 1 | 1 | 1 | 1 | 1 | 12 |
| $S_2$=Single Error | | | | | | | | | 0 | 0 | 0 | 0 | 0 | 0 | 0 | 0 | 0 | 0 | 1 | 0 | 0 | 13 |
| N=3 | 0 | ... | 0 | 0 | 0 | 0 | 1 | 1 | 0 | 0 | 0 | 0 | 1 | 1 | 1 | 1 | 1 | 1 | 0 | 1 | 1 | 14 |
| $S_3$=No Errors | | | | | | | | | 0 | 0 | 0 | 0 | 0 | 0 | 0 | 0 | 0 | 0 | 0 | 0 | 0 | 15 |

positive signal is supplied through the OR-circuit 62 in FIG. 3 to the complement input of the flip-flop 71. This positive signal complements the flip-flop to correct bit 1 of the binary word. It is readily seen from this illustration how the remaining AND circuits of the decoder 33 in FIG. 33 are operated by the syndrome S bits to perform error correction operations on word bits 1 through 45 in response to the syndrome S bit having the valid code bit combinations shown in rows 1 through 45 of Table 1.

Reference is made next to FIG. 3 for a discussion of the control circuit 34. The syndrome S bits $s_1$ through $s_{13}$ are supplied to an OR-circuit 111 and an exclusive OR-circuit 112. The The binary number with a value of three in the data register 10 is supplied to the exclusive OR-tree 31 in FIG. 2, and the exclusive OR-tree 31 generates syndrome bits $s_1$, through $s_{13}$ according to equations (3), (5), and (6). These 13 bits are stored in the syndrome register 32. Output signals from the syndrome register 32 are supplied to the OR-circuit 111 and the exclusive OR-circuit 112. Since the word in the data register 10 is a correct word, the generated syndrome S bits are all binary zeros. Binary zeros are represented by negative signals, and the OR-circuit 111 supplies a negative output signal which is changed by the inverter 115 to a positive signal on the line 18. The positive signal on the line 18 operates the set of gates 12 in FIG. 2 to transfer the correct word from the data register 10 to the load device 14. This illustrates the manner in which a correct word is checked before it is forwarded to the load device 14.

Let it be assumed next that the data register 10 in FIG. 3 holds the same binary word, but let it be assumed further that check bit C2(word bit 2) is incorrect. That is, word bit 2 holds a binary zero when it should hold a binary one. This error in check bit 2 is illustrated in row 4 of Table 2. The incorrect word in the data register 10 is shown in row 5 of Table 2. The exclusive OR-tree 31 in FIG. 3 generates syndrome S bits for the single error case. The syndrome S bits $s_1$ through $s_{13}$ stored in the syndrome register 32 are shown under respective word bits 1 through 13 of row 6 in Table 2. The OR-circuit 111 and the exclusive OR-circuit 112 in FIG. 3 receive a single positive signal from the one output side of the flip-flop 73 representing the bit $s_2$. The OR-cirucit 111 supplies this positive signal to the AND-circuit 113, the AND-circuit 114, and the inverter 115. The inverter 115 changes the positive signal to a negative signal on the line 18 which inhibits the operation of the set of gates 12 in FIG. 2. The exclusive OR-circuit 112 provides a positive output signal which indicates that the parity of the syndrome S bits is odd, and this positive signal is supplied to the AND-circuit 114 and the inverter 116. The inverter 116 converts the positive signal to a negative signal which inhibits the operation of the AND-circuit 113. The AND-circuit 114 provides a positive output signal to the AND-circuit 117.

The decoder 33 in FIG. 3 receives the syndrome S bits shown in row 6 of Table 2, and this combination of code bits is identical to the valid combination of code bits in row 2 of Table 1. Consequently, the decoder 33 in FIG. 3 selects the line 102, and it supplies a positive signal on the line 102. The positive signal on the line 102 is supplied through the OR-circuit 130 of the control circuit 34 to the inverter 131 where it is changed to a negative signal which inhibits the operation of the AND-circuit 117. Consequently, the AND-circuit 119 is inhibited from operating by a negative signal from the OR-circuit 118, and the output signal from the AND-circuit 119 is a negative signal which prevents a shift operation in the shift register 30. The positive signal on the line 102 is supplied also through the OR-circuit 63 to the complement input of the flip-flop 72 of the data register 10. This positive signal complements the flip-flop 72 from the zero state to the one state, and the single error in check bit C2 (word bit 2) is corrected. Thus it is seen how single error detection and correction takes place. The correct word in the data register 10 then is the same as that shown in row 3 of Table 2, and the exclusive OR-tree 31 generates a new set of syndrome S bits each of which has a binary zero. Thus the OR-circuit 111 of the control circuit 34 receives negative signals on all of its input lines, and the OR-circuit 111 supplies a negative signal to the inverter 115 which converts this signal to a positive signal on the line 18 to operate the set of gates 12 in FIG. 2 thereby to transfer the correct word from the data register 10 to the load device 14.

Let it be assumed next that the binary word having the value of three is held in the data register 10, and let it be assumed further that both the check bit C2 (word bit 2) and the check bit C3 (word bit 3) are incorrect. This is indicated by row 7 in Table 2. The binary word with double errors is shown in row 8 of Table 2. If the binary word in row 8 of Table 2 is compared with the binary word in row 3, it is readily seen that (1) word bit 2 erroneously holds a binary zero and (2) word bit 3 erronously holds a binary one. The information shown in row 8 of Table 2 is supplied by the data register 10 in FIG. 3 to the exclusive OR-circuit 31 which generates syndrome $S_0$ bits $s_1$ through $s_{13}$ that have the binary values shown in respective word bit columns 1 through 13 of row 9 in Table 2. It is pointed out that syndrome bits $s_2$ and $s_3$ hold binary ones, and the remaining syndrome bits $s_1$, and $s_4$ through $s_{13}$ hold binary zeros. Consequently, the flip-flops 133 and 134 in FIG. 3 supply positive signals from their one output sides to the OR-circuit 111 and the exclusive OR-circuit 112 of the control circuit 34. The OR-circuit 111 then supplies a positive output signal to the inverter 115 which in turn supplies a negative output signal that inhibits the operation of the set of gates 112 in FIG. 2 thereby to prevent the transfer of the erronous data in the data register 10 to the load device 14. The positive signal from the OR-circuit 111 is supplied also the AND-circuits 113 and 114 in FIG. 3. The exclusive OR-circuit 112 determines the parity of the syndrome S bits, and it responds to the two positive signals from flip-flops 73 and 74, representing binary ones, to provide a negative output signal which indicates an even parity. The negative output signal from the exclusive OR-circuit 112 inhibits the operation of the AND-circuit 114. The negative output signal from the exclusive OR-circuit 112 is changed by the inverter 116 from a negative signal at its input to a positive signal at its output which signal is applied to the AND-circuit 113. Since both inputs to the AND-circuit 113 are energized with positive signals, the AND-circuit 113 supplies a positive signal through the OR-circuit 118 to the AND-circuit 119. The positive signal from the AND-circuit 113 signifies that there are 2, 4, 6, 8, etc. errors in the word held by the data register 10. For the purposes of this invention it always is assumed that there are two errors when this condition arises. The AND-circuit 119 in FIG. 3 passes the next positive timing pulse on the line 120, and this positive pulse is supplied on the line 40 to the shift register stages 51 through 55.

The shift register 30 in FIG. 3 initially holds a binary one in the stage 51, and it holds binary zeros in the remaining stages 52 through 55. The positive shift pulse on the line 40 shifts the binary one from the stage 51 to the stage 52. The shift register 30 then holds a binary one in stage 52, and it holds binary zeros in all of the remaining stages. The stages holding binary zeros supply negative output signals which are ineffective to change the state of the associated flip-flops 72 through 74 of the data register 10. However, the stage 52 holds a binary one, and it supplies a positive output signal through the OR-circuit 62 thereby to complement the flip-flop 71 from the one state to the zero state. The word then held in the data register 10 is shown in row 10 of Table 2. This operation introduces a third error in the content of the data register 10 in FIG. 3 because word bit 1 is now incorrect. The exclusive OR-tree 31 in FIG. 3 responds to the modified content of the data register 10 and generates new syndrome $S_1$ bits $s_1$ through $s_{13}$ as indicated in respective columns 1 through 13 of row 11 in Table 2. The content of the syndrome register 32 is shown in row 11 of Table 2. The flip-flops 132 through 134 then hold binary ones, and the remaining flip-flops of the syndrome register hold binary zeros. The positive signals from the one outputs of the flip-flops 132 through 135 of the syndrome register 32 are supplied to the OR-circuit 111 and the exclusive OR-circuit 112 of the control circuit 34. The OR-circuit 111 in turn supplies a positive output signal to the inverter 115 which changes this positive signal to a negative signal on the line 18 which inhibits the operation of the set of gates 12 in FIG. 2. The positive signal from the OR-circuit 111 is supplied also to the AND-circuits 113 and 114. The exclusive OR-circuit 112 responds to the three positive input signals from the flip-flops 132 through 135 of the syndrome register 32, and the exclusive OR-circuit 112 determines that the parity of the content of the syndrome register 32 is odd. Therefore, the exclusive OR-circuit 112 supplies a positive signal to the inverter 116 and the AND-circuit 114. The positive signal supplied to the inverter 116 is converted to a negative output signal which inhibits the operation of the AND-circuit 113. The AND-circuit 114 receives positive signals on both of its two inputs, and it supplies a positive output signal to the AND-circuit 117.

The decoder 33 in FIG. 3 receives the syndrome S bits shown in respective word bit columns 1 through 13 of row 11 in Table 2. It is readily seen by observation that the combination of signals in row 11 of Table 2 is unlike any of the combination of signals of rows 1 through 45 of Table 1. This is an invalid combination of code bits. Consequently, the decoder 33 in FIG. 3 does not respond to the syndrome S bits, and the decoder 33 does not supply a positive signal on any one of its output lines. Thus the OR-circuit 130 in FIG. 3 receives negative input signals on all of its input lines, and this indicates that a correction operation did not take place in any of the bits in the data register 10. The negative output signal from the OR-circuit 130 is supplied to the inverter 131 where this negative input signal is changed to a positive output signal. The positive output signal from the inverter 131 is supplied to the AND-circuit 117. The AND-circuit 117 supplies a positive output signal through the OR-circuit 118 to the AND-Circuit 119. A positive signal from the AND-circuit 117 signifies that there are 3, 5, 7, or any greater odd number of errors. The triple error case is assumed for purposes of this invention whenever this condition arises.

When the next positive timing pulse is supplied on the line 120, the AND-circuit 119 passes this positive pulse on the line 40 to the stages 51 through 55 of the shift register 30. This causes the shift register 30 to shift its content one position to the left. The binary one stored in the stage 52 is then shifted to the stage 53. After the shift operation is complete, the shift register 30 holds binary zeros in the stages 51, 52, 54, and 55, and the shift register 30 holds a binary one in the stage 53. The stage 53 then supplies a positive output signal which passes through the OR-circuit 62 to the complement input of the flip-flop 71, and the flip-flop 71 changes from the zero state to the one state. The positive output signal from the stage 53 of the shift register 30 is supplied also through the OR-circuit 63 to the complement input of the flip-flop 72 of the data register 10. This complements the flip-flops 72, and it changes from the zero state to the one state. The content of the data register 10, after bit 1 and bit 2 are complemented, is shown in row 12 of Table 2. The complementing operation in effect (1) restored bit 1 to its correct state and (2) changed bit 2 from the incorrect state to the correct state. It is readily seen by comparing the information in row 3 of Table 2 with the information in row 12 that a single error remains in word bit 3. More specifically, word bit 3 in flip-flop 73 of the data register 10 in FIG. 3 erronously holds a binary one. The exclusive OR-tree 31 in FIG. 3 responds to the modified content of the data register 10 and generates new syndrome $S_2$ bits which are stored in the syndrome register 32. The content of the syndrome register 32 is shown in row 13 of Table 2. The flip-flop 134 of the syndrome register 32 holds a binary one, and all remaining stages of the syndrome register 32 hold binary zeros. The positive signal from the one output side of the flip-flop 74 is supplied to the OR-circuit 111 and the exclusive OR-circuit 112 of the control circuit 34. The positive output signal from the OR-circuit 111 is inverted by the inverter 115 to a negative signal on the line 18 which inhibits the operation of the set of gates 12 in FIG. 2. The positive signal from the OR-circuit 111 is supplied also to the AND-circuits 113 and 114. The exclusive OR-circuit 112 determines the parity of the content of the syndrome register 32. The parity of the content of the syndrome register 32 is odd since there is a single binary one in the syndrome register 32. Consequently, the exclusive OR-circuit 112 supplies a positive output signal to the inverter 116 and the AND-circuit 114. The inverter 116 changes the positive input signal to a negative output signal which inhibits the operation of the AND-circuit 113. The AND-circuit 114 responds to positive signals on both of its input lines to provide a positive output signal to the AND-circuit 117.

The decoder 33 in FIG. 3 receives the syndrome S bits from the syndrome register 32, and the content of the syndrome register 32 is shown in row 13 of table 2. The combination of code bits in row 13 of Table 2 is identical to the combination of code bits in row 3 of Table 1. This combination of code bits is a valid combination which is effective to operate the AND-circuit 93 in FIG. 4 to supply a positive output signal on the line 103. A positive signal on the line 103 passes through the OR-circuit 64 in FIG. 3 to the complement input of the flip-flop 73. This changes the flip-flop 73 from the one state to the zero state, and after this complementing operation is complete, the content of the data register 10 holds the information shown in row 14 of Table 2.

The positive signal from the decoder 33 on the line 103 in FIG. 3 is supplied through the OR-circuit 130 to the inverter 131. The inverter 131 inverts the positive input signal to a negative output signal which inhibits the operation of the AND-circuit 117. Consequently, negative signals from the AND-circuit 113 and the AND-circuit 117 are supplied through the OR-circuit 118 to inhibit the operation of the AND-circuit 119. Consequently, further positive timing pulses on the line 120 are not passed on the output line 40 to the shift register 30, and no further shift operations take place in the shift register 30.

The content of the data register 10 then holds a correct binary word representing the value of three. The exclusive OR-tree 31 in FIG. 3 generates syndrome S bits which are stored in the syndrome register 32. The syndrome register 32 then holds binary zeros in all stages as indicated by the row 15 in Table 2. The OR-circuit 111 of the control circuit 34 then supplies a negative output signal to the inverter 115. The inverter 115 changes the negative input signal to a positive output signal on the line 18 which resets the shift register 30. When the shift register 30 is reset, it holds a binary one in stage 51, and it holds binary zeros in all remaining stages. The positive output signals from the inverter 115 is supplied on the line 18 to operate the set of gates 12 in FIG. 2 to transfer the correct information in the data register 10 to the load device 14. Thus it is seen how double errors in a binary word are detected and corrected according to this invention.

Figure 5:
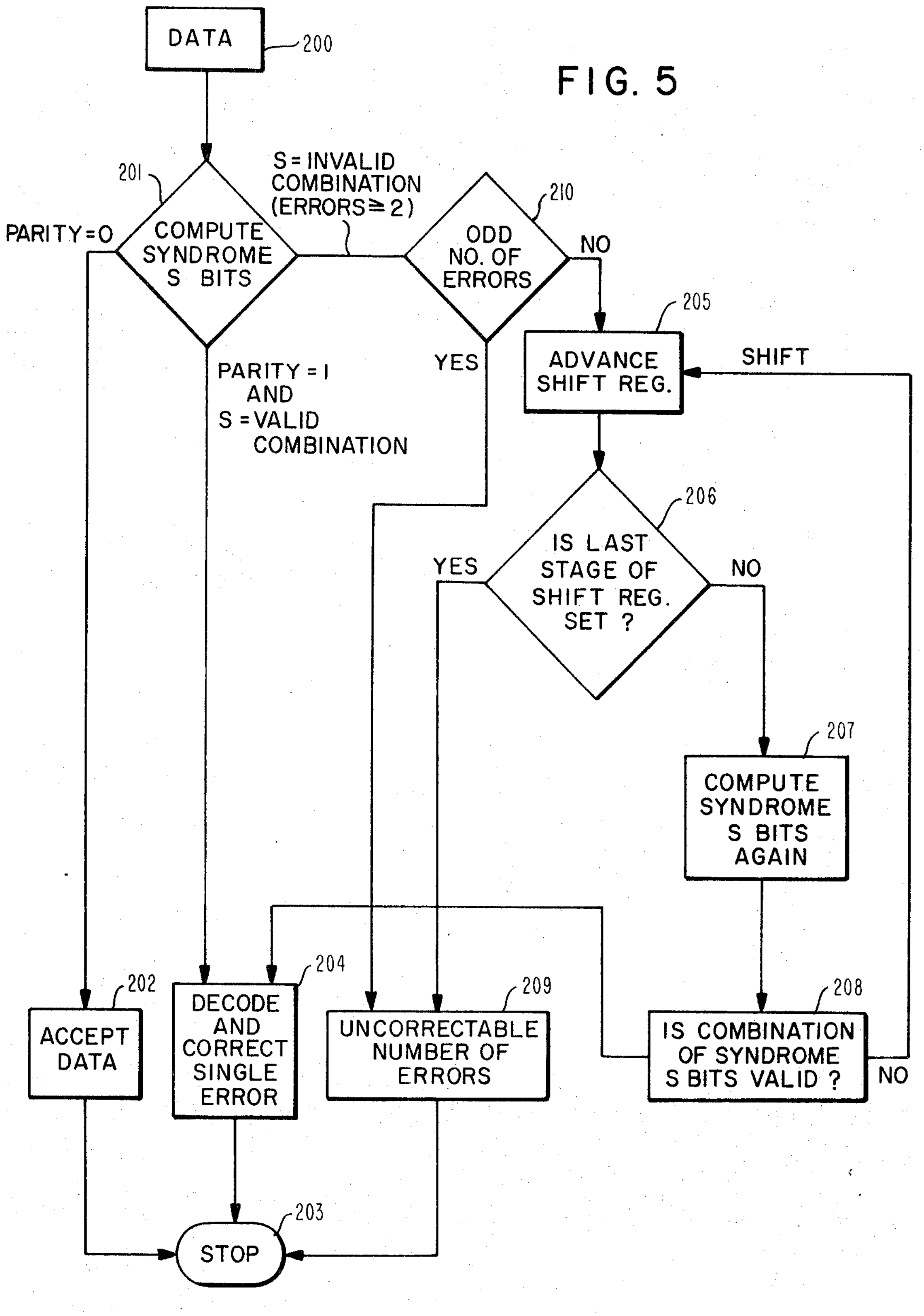
FIG. 5 is a flow chart which illustrates the novel method of detecting and correcting single and double errors according to this invention.

Reference is made next to FIG. 5 which is a flow chart illustrating the steps of the novel algorithm for detecting and correcting single and double errors according to this invention. A binary word having a plurality of bits including check bits and data bits is represented by the block 200. The first step is to compute or determine the syndrome S bits, and this is represented by the block 201. If the parity of the syndrome S bits is zero, the data is accepted as being error free, and this is represented by the block 202. The checking process then is terminated, and this is represented by the block 203. If the parity of the syndrome S bits is odd and the combination of the syndrome S bits is a valid combination, then the syndrome S bits themselves specify a single error, and they are decoded to locate and correct the single error. This is represented by the block 204. The error correction process is then finished as indicated by the block 203. If there are two or more errors, then a determination must be made as to whether the multiple errors are an even number of errors or an odd number of errors. This is done by the block 210. If there are multiple odd errors in a word supplied to the shift register 30, then there are an uncorrectible number of errors as indicated by the block 209, and the correction process is terminated as indicated by the block 203. In this connection it should be pointed out that if the parity of the syndrome S bits is odd and the combination of the syndrome bits is an invalid combination, which is indicated by a positive signal from the AND-circuit 117 in FIG. 3, then an uncorrectible number of errors have occurred, and the positive signal from the AND-circuit 117 may be utilized to terminate the correction process by equipment not shown. If the correction process is not terminated by this technique, then the shift register 30 may be operated through its cycle at which time the process terminates. If the determination by the block 210 indicates that the multiple errors are an even number of errors, then the assumption is made that there are double errors, and the shift register 30 is operated as previously explained. This is indicated by the block 205. It is recalled that the shift register 10 in the reset condition has a binary zero in each of the stages 52 through 55 in FIG. 3 and a binary one in stage 51. As the binary one is shifted from one stage to another of the shift register 30, test operations takes place on successive bits of the word in the data register 10. The block 206 in FIG. 5 signifies whether or not the last stage 55 in FIG. 3 has been set by the binary one state. If not, the syndrome S bits are computed from the check bits and the data bits of the binary word, and the test operations continue. This is indicated by the block 207 in FIG. 5. Next the code combination of syndrome S bits is checked to see if it is a valid combination, and this is indicated by the block 208. If there is an invalid combination, the shift register is advanced again as indicated by the block 205. The checking process is repeated until (1) the block 208 indicates a valid combination of syndrome bits has been found, at which time a single error detection and correction operation takes place as indicated by the block 204, or (2) the block 206 indicates that all stages of the shift register 30 have been operated and all stages of the data register 10 have been tested without correcting an error. In this event there are an incorrectible number of errors, and this is indicated by the block 209. The test operations are then terminated as indicated by the block 203.

The novel method according to this invention may be summarized as including the following steps:

1. storing a binary word having a plurality of bits including check bits and data bits,
2. generating syndrome S bits from the check bits and the data bits,
3. correcting single errors by decoding the syndrome S bits,
4. correcting double errors by reversing the binary state of one bit of the binary word,
5. generating a new set of syndrome S bits,
6. restoring the original binary state of the one bit of the binary word if one of the double errors is not corrected.
7. repeating steps (4) through (6) on the remaining bits of the binary word until one of the double errors is corrected.
8. then generating a new set of syndrome S bits from the modified binary word having a single error, and
9. decoding the syndrome S bits and correcting the remaining single error identified by the syndrome S bits.

While the invention has been particularly shown and identified with reference to a preferred embodiment thereof, it will be understood by those skilled in the art that various changes in form and details may be made therein without departing from the spirit and scope of the invention.

What is claimed is:

1. An error detection and correction device for detecting and correcting single and double errors and for detecting triple errors, said error detection and correction device comprising:

a data register having a plurality of stages for holding a binary word including check bits and data bits, a shift register having a plurality of stages connected to the stages of the data register, said shift register holding binary zeros in all stages except one stage which holds a binary one, an exclusive OR tree connected to the data register, said exclusive OR tree receiving the check bits and the data bits from the data register and generating syndrome S bits, a syndrome register connected to the exclusive OR tree for holding the syndrome S bits, a decoder connected to the syndrome register and the data register, said decoder responding to the syndrome S bits to provide an output correction signal to change a selected check bit or data bit in the data register whenever the syndrome S bits specify a single error, a control circuit connected to the syndrome register, the decoder and the shift register, said control circuit including first means responsive to the syndrome S bits from the syndrome register for performing successive test operations on successive bits of the data register by shifting the shift register as long as the syndrome S bits specify two or more errors, said first means operating said shift register to complement one, and only one, bit of the data register for each test operation and to restore the tested bit of the data register before the next test operation takes place, and said control circuit including second means responsive to the output correction signal from the decoder for terminating the test operations whenever the decoder responds to the syndrome S bits to correct a single error in the data register.

2. An error detection and correction device comprising:

first means for storing a binary word having a plurality of bits including check bits and data bits, second means connected to the first means which responds to the check bits and data bits and generates syndrome S bits, third means connected between the second means and the first means which responds to the syndrome S bits to generate a correction signal to correct a selected check bit or data bit whenever the syndrome S bits specify a single error, and fourth means connected to the second means to receive syndrome S bits and connected to the third means to receive correction signals, said fourth means being connected to the first means to complement, and restore if an error is not corrected, the binary word bits one at a time thereby to perform test operations on the word bits whenever two ore more errors exist in the binary word, and said third means inhibiting further operation of said fourth means whenever the syndrome S bits specify a single error which is corrected by the third means.

3. An error detection and correction device comprising:

first means for storing a binary word having a plurality of bits including check bits and data bits, second means connected to the first means which responds to the check bits and data bits and generates syndrome S bits, third means connected between the second means and the first means which responds to the syndrome S bits to generate a correction signal to correct a selected check bit or data bit whenever the syndrome S bits specify a single error, and fourth means connected to the first means, the second means, and the third means which responds to the syndrome S bits when double errors exist in the binary word and initiates test operations on the bits of the binary word by changing, and then restoring if an error is not corrected, the various bits of the binary word until one of the double errors is corrected by the fourth means, whereby the third means then responds to the syndrome S bits to correct the remaining single error.

4. An error detection and correction device comprising:

first means for storing a binary word having a plurality of bits including check bits and data bits, second means connected to the first means which responds to the check bits and data bits and generates syndrome S bits, third means connected between the second means and the first means which responds to the syndrome S bits to generate a correction signal to correct a selected check bit or data bit whenever the syndrome S bits specify a single error, fourth means connected to the third means which responds to syndrome S bits when double errors occur in the binary word to reverse the binary state, and then restore the original binary state if an error is not corrected, of the binary word bits one at a time until one of the double errors is corrected, and fifth means connected between the third means and fourth means which inhibits further operation of the fourth means when the third means generates a correction signal to correct the remaining single error.

5. An error detection and correction device comprising:

a register for storing a binary word having a plurality of bits including check bits and data bits, first means connected to the register which responds to the check bits and data bits and generates syndrome S bits, a decoder connected between the first means and the register which responds to the syndrome S bits to generate a correction signal to correct a selected check bit or data bit in the register whenever the syndrome S bits specify a single error, and a control device connected to the decoder, the first means, and the register which responds to the syndrome S bits when double errors exist in the binary word and initiates test operations by changing, and then restoring if an error is not corrected, the bits of the binary word one at a time until one of the double errors is corrected by the control device, whereby the third means then responds to the syndrome S bits to correct the remaining single error.

6. An error detection and correction device comprising:

a data register for storing a binary word having a plurality of bits including check bits and data bits, first means connected to the data register which responds to the check bits and data bits and generates syndrome S bits, decoding means connected between the first means and the data register which responds to the syndrome S bits to generate a correction signal to correct a selected check bit or data bit whenever the syndrome S bits specify a single error, a control device connected to the decoding means, the first means, and the data register, said control device including first control means which responds to syndrome S bits when double errors occur in the binary word to reverse the binary state, and then restore the original binary state if an error is not corrected, of the binary word bits successively until one of the double errors is corrected, and said control device including second control means connected between the decoding means and the first control means which inhibits further operation of the first control means when the decoding means generates a correction signal to correct the remaining single error.

7. The method of correcting double errors in a binary word having a plurality of bits including check bits and data bits, the method comprising the steps of:

1. generating syndrome S bits from the check bits and data bits,
2. correcting single errors by decoding the syndrome S bits,
3. correcting double errors by first locating and correcting one of the double errors by changing the binary state, and then restoring the original binary state if an error is not corrected, of the bits of the binary word successively until the syndrome S bits specify a single error in the binary word, and
4. then correcting the remaining single error by decoding the syndrome S bits.

8. The method of correcting double errors in a binary word having a plurality of bits including check bits and data bits, the method comprising the steps of:

1. storing the binary word,
2. generating syndrome S bits from the check bits and data bits,
3. correcting single errors by decoding the syndrome S bits,
4. correcting double errors by reversing the binary state, and then restoring the original binary state if an error is not corrected, of the bits of the binary word successively until one of the double errors is corrected and
5. then correcting the remaining single error by decoding the syndrome S bits.

9. The method of correcting double errors in a binary word having a plurality of bits including check bits and data bits, the method comprising the steps of:

1. generating syndrome S bits from the check bits and data bits,
2. correcting single errors by decoding the syndrome S bits,
3. correcting double errors by first automatically locating and correcting one of the double errors with the technique of:
   a. reversing the binary state of one word bit,
   b. generating new syndrome S bits,
   c. restoring the original state of the one word bit if the new syndrome S bits fail to indicate a single error,
   d. repeating steps (a) through (c) on the remaining binary word bits until the new syndrome S bits specify a single error in the binary word, and
4. then decoding such new syndrome S bits and correcting the word bit specified.

10. The method of correcting double errors in a binary word having a plurality of bits including check bits and data bits, the method comprising the steps of:

1. storing the binary word,
2. generating syndrome S bits from the check bits and data bits,
3. correcting single errors by decoding the syndrome S bits,
4. correcting double errors by reversing the binary state of one bit of the binary word,
5. generating a new set of syndrome S bits,
6. restoring the original binary state of the one bit of the binary word if one of the double errors is not corrected,
7. repeating steps (4) through (6) on the remaining bits of the binary word until one of the double errors is corrected,
8. then generating a new set of syndrome S bits from the modified binary word having a single error, and
9. decoding the syndrome S bits and correcting the remaining single error identified by the syndrome S bits.

* * * * *